Patented Oct. 9, 1951

2,570,185

UNITED STATES PATENT OFFICE 2,570,185

ALKOXYSILANE-AMINE ASPHALT ADDITIVE

Paul H. Aldrich, Urbana, Ill., assignor to Minnesota Mining & Manufacturing Company, St. Paul, Minn., a corporation of Delaware No Drawing. Application April 18, 1947,
Serial No. 742,469

15 Claims. (Cl. 260—28)

1

This invention concerns the asphalt coating of rock particles, as in the preparation of asphalt-aggregate highway mix. In particular, the invention concerns the preparation and application of compositions which, when added to asphalt in extremely small percentages, serve the dual purpose of making possible the effective coating of rock surfaces under widely varying conditions, and of preventing the subsequent stripping or removal of the asphalt coating by water.

An object of the invention is therefore the preparation of a new asphalt-additive material which imparts improved properties to asphalt. A further object is the preparation of a new asphalt-additive material which may be employed in extremely small and economical percentages. A specific object includes the preparation of asphalt-additives which, when added in small percentages, impart to asphaltic base materials or the like the properties both of readily wetting and effectively coating a variety of surfaces, including water-coated rock surfaces, and also of resisting the stripping action of water on the asphalt after application to such surfaces. Another object is the preparation of asphalt-additives having particular utility in the pre-treatment of asphaltic materials designed for application to rock particles such as road aggregate. A still further object is the provision of new compositions of matter. Other objects will be pointed out, or will become apparent, as the specification proceeds.

The objects of this invention are accomplished by procedures involving the mixing together of certain organic derivatives of silane with certain organic amino compounds.

The resulting compositions may be added in small percentages to asphalt, and the treated asphalt then applied to wet or dry rock surfaces to form a well-coated and non-stripping product. Alternatively, the compositions may be applied to wet or dry rock surfaces as a solution, e. g., in a small amount of mineral oil or volatile hydrocarbon solvent, and untreated asphalt may then be subsequently applied to the thus treated aggregate.

Organic amino compounds which have been found useful in preparing the novel compositions of the invention include the high molecular weight aliphatic primary amines containing a carbon chain of at least about six carbon atoms. Compounds of this type have previously been suggested as additives for asphalt, but by themselves have been found to possess certain disadvantages for such use as compared to the compositions of

2 the present invention. For example, asphalt coatings containing only the amino compounds as additives, in the presence of water are in many cases rather rapidly stripped from rock granules to which previously applied, as shown by results obtained in the Nicholson stripping test or modifications thereof.

The Nicholson test is carried out as follows: add 2.5 grams of cut-back asphalt such as RC–2 to 50 grams of air-dry crushed rock having a particle size corresponding to four-to-ten-mesh. Mix until the rock is completely coated, and allow the product to stand for 24 hours at room temperature. Seal the asphalt-coated rock in an 8-ounce sample bottle together with 100 milliliters of distilled water, and tumble the bottle end-over-end for one hour at 40 R. P. M. and at a temperature of 125° F. Determine by inspection the percentage of granules from which the alphalt coating has been removed.

In a typical room-temperature soaking test, using an aggregate mixed with an unmodified cut-back asphalt (RC–2), practically all of the asphalt was stripped from the rock. When a small amount, e. g. 0.2–0.4%, of a mixture of these long-chain aliphatic primary amines was added to the cut-back asphalt before mixing with the rock, about 40% stripping was experienced. The products of the present invention, added in similar proportions, have reduced the amount of stripping to less than 5% when tested under identical conditions.

In addition to the high stripping resistance imparted to asphalt-coated aggregate, these compositions also impart desirable wetting properties to asphalt or other similar materials with which they may be combined. Asphalt alone, when mixed with rock carrying a surface coating of water, does not wet the rock, i. e. does not replace the water level. Asphalt containing the compositions here contemplated, however, readily replaces such water films, thus making possible the successful application of the asphalt to wet aggregate and eliminating expensive and time-consuming pre-drying operations in the preparation of asphalt-aggregate mix for highway repair and construction.

In preparing my novel compositions, I add to the alkyl amine, preferably in liquid form and at a slightly elevated temperature, a substantial amount of a silane derivative having both amino groups and substantially non-hydrolyzable carbinoxy groups attached to the silicon atom. A typical compound of this class is di-t-butoxy diaminosilane (t-$C_4H_9O$)$_2Si(NH_2)_2$, such as may be prepared by the ammonolysis of di-t-butoxy dichlorosilane. The crude product resulting from the ammonolysis is predominantly of the formula indicated, as shown by analysis, but may contain also small percentages of related compounds such as tri-t-butoxyaminosilane, polymeric materials, etc. The crude material may be used as such, or the di-t-butoxy diaminosilane may first be isolated and purified by distillation.

Both the alkyl amines and the aminosilanes which I employ slowly liberate ammonia on long standing, so that sealed vessels containing such materials normally also contain measurable traces of free ammonia. However, on combining alkyl amines and di-t-butoxy diaminosilane, for example, as will be shown in detail in Example 1 below, a rapid additional evolution of ammonia takes place, with considerable bubbling and foaming of the liquid mixture. While the amount of ammonia thus given off bears no apparent stoichiometric relationship to the original components, and no specific identifiable new compounds have been isolated from the resulting composition, it is apparent that some interreaction must have occurred between the two raw materials.

It has been found that aminosilanes having more than one amino group for each silicon atom are required in order to obtain desirable anti-stripping properties in an asphalt-aggregate road material. In addition, there must be present at least one tertiary-carbinoxy group, i. e. a group having a tertiary carbon atom attached to an oxygen atom which is in turn attached to the silicon atom.

While some slight improvement in anti-stripping properties is noted with compositions prepared with very small proportions of aminosilane, in general the most desirable proportions lie within the range of 20–50 parts of aminosilane and correspondingly 80–50 parts of organic amine. For the particular ingredients employed in Example 1, the 1:3 ratio there shown is preferred.

The following examples are given in order more explicity to set forth certain salient features of the invention, which, however, is to be considered as limited only as required by the prior art and the appended claims.

Example 1

| | Parts by weight |
|---|---|
| Long-chain fatty amine | 76 |
| Di-t-butoxydiamino silane (crude) | 24 |

Melt the fatty amine by heating to about 175° F., and add the silane slowly with stirring. A considerable amount of bubbling and foaming occurs, with rapid liberation of ammonia. Hold at 160–170° F. and continue stirring until the evolution of ammonia has substantially ceased. Cool to room temperature. The product is a soft waxy solid, insoluble in water, melting at approximately 100° F., and compatible in small proportions with hydrocarbon oils and asphalt.

The long-chain fatty amine employed in this example was a mixture containing approximately 30% hexadecylamine, 25% octadecylamine, and 45% octadecenyl amine. The mixture had a melting point of 115° F. It was approximately neutralized (converted to the amine hydrochloride) on the addition of 32.7 grams of 36% HCl to 100 grams of the mixture.

The di-t-butoxydiaminosilane crude was obtained on ammonolysis of unpurified di-t-butoxydichlorosilane, which was in turn prepared by reaction of t-butyl alcohol and silicon tetrachloride in the presence of pyridine. It contained approximately 70% by weight of pure di-t-butoxydiaminosilane, boiling at 83° C. and 20 mm. pressure.

To 100 parts by weight of a rapid curing cutback asphalt, containing 70 parts of asphalt cement in 30 parts of naptha solvent, was added 0.32 part by weight of the waxy material prepared as above indicated. The mixture was heated to 120° F. and thoroughly stirred. It was then mixed with crushed rock, e. g. greystone, granite, or rhyolite, which had previously been well wet with water. The rock was rapidly wetted and completely covered by the asphalt. The asphalt coating remained attached to the rock surfaces even on prolonged soaking in water, and a Nicholson test showed less than 5% stripping.

("Asphalt cement," "rapid curing cut-back asphalt," "R-2," and like terms are identified in the "Asphalt Pocket Reference for Highway Engineers," published by The Asphalt Institute, 1937.)

Without the addition of the waxy material, the same cut-back asphalt would not coat the wet rock surfaces even after prolonged mixed.

The asphalt could be mixed with pre-dried aggregate to form a apparently firmly bonded continuous coating. In the Nicholson test, however, such coating was almost completely removed from the rock granules.

Example 2

| | Parts by weight |
|---|---|
| Dodecyl amine | 100 |
| Crude di-t-butoxy diamino silane as in Example 1 | 100 |

The dodecyl amine was a liquid product at room temperature. It was mixed with the crude silane at room temperature and allowed to stand for several hours, at which time bubbling had ceased and the small amount of foam, originally formed, had subsided. The product was liquid at room temperature.

Small amounts of this composition were added to asphalt, which was then tested for wetting properties by mixing with wet rock aggregate. Excellent wetting as well as anti-stripping properties were obtained with asphalt containing 0.3% of the composition.

Example 3

| | Parts by weight |
|---|---|
| Long-chain fatty amine | 80 |
| Di-t-amoxy diamino silane | 20 |

The long-chain fatty amine used in this example was composed approximately of 8% octylamine, 9% decylamine, 47% dodecylamine, 18% tetradecylamine, 8% hexadecylamine, 5% octadecylamine, and 5% octadecenylamine. One hundred grams of amine was found to be equivalent to 42.5 grams of 36% HCl. The mixture melted at approximately 75° F.

The aminosilane was a purified product boiling at 118° C at 20 mm. pressure.

Asphalt containing small amounts of the composition prepared by mixing the above components in liquid form, e. g., at 80–200° F., was found to have excellent wetting and anti-stripping properties.

Example 4

| | Parts by weight |
|---|---|
| Heptylamine | 100 |
| Crude di-t-butoxydiaminosilane (as in Example 1) | 100 |

On mixing the two liquids, ammonia was evolved. The resulting liquid product was added to asphalt for testing. It was found that somewhat increased amounts of this composition were required to produce wetting and anti-stripping properties equivalent to those obtained with smaller amounts of the compositions of the previous examples.

*Example 5*

This example illustrates an alternative method of obtaining an improved asphalt-aggregate highway mix or the like in which the rock aggregate is first treated with a composition as herein described, and subsequently is mixed with an untreated asphalt.

A sufficient amount of the liquid amine-silane composition described under Example 2 was dissolved in heptane to form a one percent solution, of which 0.375 gram was applied to 25 grams of greystone aggregate; this amount was just sufficient to cover all rock surfaces. The heptane was allowed to evaporate. The treated rock was then covered with an excess of water, and 1.25 grams of rapid curing cut-back asphalt was added and mixed with the wet rock. The asphalt completely coated the rock particles.

What I claim is:

1. A composition having value as a wetting and anti-stripping agent in connection with the preparation and use of asphalt-aggregate highway mix, said composition comprising the product obtained by mixing together a tertiary-carbinoxy polyamino silane and an organic amine having an —NH₂ group attached to an aliphatic chain containing six to eighteen contiguous carbon atoms, and heating to a temperature above the melting points but below the boiling points of said silane and said amine.

2. A composition having value as a wetting and anti-stripping agent in connection with the preparation and use of asphalt-aggregate highway mix, said composition comprising a water-insoluble organic silicon product compatible with asphalt, containing nitrogen atoms and containing tertiary-carbinoxy groups attached to silicon, and said product being that obtained on mixing together a tertiary-carbinoxy polyamino silane and at least about an equal weight of organic amine having an —NH₂ group attached to an aliphatic chain containing six to eighteen contiguous carbon atoms, and heating to a temperature above the melting points but below the boiling points of said silane and said amine.

3. A composition having value as a wetting and anti-stripping agent in connection with the preparation and use of asphalt-aggregate highway mix, said composition comprising the product obtained by mixing together about 20–50 parts of tertiary-carbinoxy polyamino silane and correspondingly about 80–50 parts of organic amine having an —NH₂ group attached to an aliphatic chain containing six to eighteen contiguous carbon atoms, and heating to a temperature above the melting points but below the boiling points of said silane and said amine.

4. A composition having value as a wetting and anti-stripping agent in connection with the preparation and use of asphalt-aggregate highway mix, said composition comprising a water-insoluble organic silicon product compatible with asphalt, containing nitrogen atoms and containing tertiary-alkoxy groups attached to silicon, and said product being that obtained on mixing together a tertiary-alkoxy polyamino silane and at least about an equal weight of long-chain aliphatic primary amine having a chain length of six to eighteen carbon atoms, and heating to a temperature above the melting points but below the boiling points of said silane and said amine.

5. A composition having value as a wetting and anti-stripping agent in connection with the preparation and use of asphalt-aggregate highway mix, said composition comprising a water-insoluble organic silicon product compatible with asphalt, containing nitrogen atoms and containing tertiary-alkoxy groups attached to silicon, and said product being that obtained on mixing together a tertiary-alkoxy diamino silane and at least about an equal weight of organic amine having an —NH₂ group attached to an aliphatic chain containing six to eighteen contiguous carbon atoms, and heating to a temperature above the melting points but below the boiling points of said silane and said amine.

6. A composition having value as a wetting and anti-stripping agent in connection with the preparation and use of asphalt-aggregate highway mix, said composition comprising a water-insoluble organic silicon product compatible with asphalt, containing nitrogen atoms and containing tertiary-alkoxy groups attached to silicon, and said product being that obtained on mixing together a di-tertiary-alkoxy diamino silane and at least about an equal weight of organic amine having an —NH₂ group attached to an organic group containing six to eighteen contiguous carbon atoms, and heating to a temperature above the melting points but below the boiling points of said silane and said amine.

7. A composition having value as a wetting and anti-stripping agent in connection with the preparation and use of asphalt-aggregate highway mix, said composition comprising a water-insoluble organic silicon product compatible with asphalt, containing nitrogen atoms and containing tertiary-butoxy group attached to silicon, and said product being that obtained on mixing together di-t-butoxy diamino silane and at least about an equal weight of fatty amine comprising approximately 30% hexadecylamine, 25% octadecylamine, and 45% octadecenyl amine, at a temperature of at least 115° F. but not in excess of about 175° F.

8. A composition having value as a wetting and anti-stripping agent in connection with the preparation and use of asphalt-aggregate highway mix, said composition comprising a water-insoluble organic silicon product compatible with asphalt, containing nitrogen atoms and containing tertiary-amoxy groups attached to silicon, and said product being that obtained on mixing together di-t-amoxy diamino silane and at least about an equal weight of fatty amine comprising approximately 30% hexadecylamine, 25% octadecylamine, and 45% octadecenyl amine, at a temperature of at least 115° F. but not in excess of about 175° F.

9. A composition having value as a wetting and anti-stripping agent in connection with the preparation and use of asphalt-aggregate highway mix, said composition comprising the product obtained by mixing together about 20–50 parts of di-t-butoxy diamino silane and correspondingly about 80–50 parts of fatty amine comprising approximately 30% hexadecylamine, 25% octadecylamine, and 45% octadecenyl amine, at a temperature of at least 115° F. but not in excess of about 175° F.

10. Asphalt containing about 0.2–1.0% of its weight of the composition according to claim 3.

11. Asphalt containing about 0.2–1.0 percent of its weight of the composition according to claim 4.

12. Asphalt-aggregate mix having high resistance to stripping and comprising rock aggregate, asphalt, and about 0.2–1.0%, based on the weight of said asphalt, of the composition according to claim 3.

13. Asphalt-aggregate mix having high resistance to stripping and comprising rock aggregate, asphalt, and about 0.2–1.0 percent, based on the weight of said asphalt, of the composition according to claim 4.

14. Rock having a surface treated with a composition according to claim 3.

15. Rock having a surface treated with a composition according to claim 4.

PAUL H. ALDRICH.

No references cited.